US012535754B2

(12) United States Patent
Hirota et al.

(10) Patent No.: US 12,535,754 B2
(45) **Date of Patent: *Jan. 27, 2026**

(54) IMAGE FORMING APPARATUS AND VARNISH APPLYING APPARATUS

(71) Applicant: CANON KABUSHIKI KAISHA, Tokyo (JP)

(72) Inventors: Shingo Hirota, Ibaraki (JP); Yoshiro Tsukada, Chiba (JP); Masami Hano, Chiba (JP); Toshiyuki Yamada, Tokyo (JP); Kyohei Kikuchi, Ibaraki (JP); Daisuke Katayama, Chiba (JP); Taro Hanazato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/806,183

(22) Filed: Aug. 15, 2024

(65) Prior Publication Data

US 2024/0402633 A1 Dec. 5, 2024

Related U.S. Application Data

(62) Division of application No. 18/219,164, filed on Jul. 7, 2023, now Pat. No. 12,105,449.

(30) Foreign Application Priority Data

Jul. 8, 2022 (JP) ................................ 2022-110181

(51) Int. Cl.

| | |
|---|---|
| ***G03G 15/00*** | (2006.01) |
| ***B05D 3/06*** | (2006.01) |
| ***G03G 9/09*** | (2006.01) |
| ***G03G 15/043*** | (2006.01) |
| ***G03G 15/20*** | (2006.01) |

(52) U.S. Cl.

CPC ......... *G03G 15/2007* (2013.01); *B05D 3/061* (2013.01); *G03G 9/0904* (2013.01); *G03G 15/043* (2013.01); *G03G 15/5008* (2013.01); *B05D 2501/00* (2013.01); *G03G 2215/209* (2013.01)

(58) Field of Classification Search

CPC ........... H04N 1/40037; G03G 15/2007; G03G 15/043; G03G 15/5008; B05D 3/061

USPC .................................................... 399/51, 336

See application file for complete search history.

(56) References Cited

U.S. PATENT DOCUMENTS

| | | | | |
|---|---|---|---|---|
| 2018/0081313 | A1 | 3/2018 | Murakami | |
| 2019/0193415 | A1 | 6/2019 | Yamamoto | |
| 2024/0045360 | A1 * | 2/2024 | Hanazato ........... | G03G 15/6552 |

* cited by examiner

*Primary Examiner* — Quana Grainger

(74) *Attorney, Agent, or Firm* — Venable LLP

(57) ABSTRACT

An image forming system includes an image forming unit, a varnish applying unit, a conveying unit, an irradiation unit, and a controller. The controller controls conveyance of a recording material so that a conveying speed of the recording material in a case that varnish is applied to the recording material with a toner image is formed is slower than a conveying speed of the recording material in a case that varnish is applied to the recording material with no toner image. The controller controls irradiation of the varnish with light so that intensity of the light with which the varnish is irradiated in a case that the varnish is applied to the recording material with the toner image is lower than intensity of the light with which the varnish is irradiated in a case that the varnish is applied to the recording material with no toner image.

10 Claims, 5 Drawing Sheets

IMAGE FORMING APPARATUS AND VARNISH APPLYING APPARATUS

FIELD OF THE INVENTION AND RELATED ART

The present disclosure relates to an image forming system for forming a toner image on a recording material and for applying varnish to the recording material and a varnish applying apparatus for applying the varnish to the recording material on which the toner image is formed.

In recent years, separately from a toner image formed on a recording material with a developer, a varnish image is formed on the recording material with colorless and transparent varnish in order to decorate the toner image. United States Patent Application Publication No. 2019/0193415A1 discloses, as an apparatus for forming a varnish image, a varnish applying apparatus (referred to as a varnish coater) in which varnish capable of being solidified by ultraviolet irradiation is applied and thereafter is solidified by irradiating the varnish with the ultraviolet irradiation and in which the varnish image is thus capable of being formed.

SUMMARY OF THE INVENTION

According to an aspect of the present disclosure, there is provided an image forming system comprising: an image forming unit configured to form a toner image on a recording material with first toner including carbon black; a varnish applying unit configured to apply varnish to the recording material; a conveying unit configured to convey the recording material to which the varnish is applied by the varnish applying unit; an irradiation unit configured to irradiate the varnish on the recording material with light to cure the varnish on the recording material during conveyance of the recording material by the conveying unit; and a controller configured to: control the conveyance of the recording material by the conveying unit so that a conveying speed of the recording material in a case that the varnish is applied to the recording material on which the toner image is formed by the image forming unit is slower than a conveying speed of the recording material in a case that the varnish is applied to the recording material on which no toner image is formed by the image forming unit, and control irradiation of the varnish with the light by the irradiation unit so that intensity of the light with which the varnish is irradiated in a case that the varnish is applied to the recording material on which the toner image is formed by the image forming unit is lower than intensity of the light with which the varnish is irradiated in a case that the varnish is applied to the recording material on which no toner image is formed by the image forming unit.

According to another aspect of the present disclosure, there is provided a varnish applying apparatus for applying varnish to a recording material, comprising: a varnish applying unit configured to apply varnish to the recording material; a conveying unit configured to convey the recording material to which the varnish is applied by the varnish applying unit; an irradiation unit configured to irradiate the varnish on the recording material with light to cure the varnish on the recording material during conveyance of the recording material by the conveying unit; and a controller configured to: control the conveyance of the recording material by the conveying unit so that a conveying speed of the recording material in a case that the varnish is applied by the varnish applying unit to the recording material on which the toner image is formed by the image forming unit with first toner including carbon black is slower than a conveying speed of the recording material in a case that the varnish is applied by the varnish applying unit to the recording material on which no toner image is formed by the image forming unit, and control irradiation of the varnish with the light by the irradiation unit so that intensity of the light with which the varnish is irradiated in a case that the varnish is applied by the varnish applying unit to the recording material on which the toner image is formed by the image forming unit is lower than intensity of the light with which the varnish is irradiated in a case that the varnish is applied by the varnish applying unit to the recording material on which no toner image is formed by the image forming unit.

Further features of the present invention will become apparent from the following description of exemplary embodiments with reference to the attached drawings.

DESCRIPTION OF THE EMBODIMENTS

First, an image forming system according to an embodiment will be described using FIG. 1. An image forming system 1X shown in FIG. 1 includes an image forming apparatus 100 for forming a toner image on a recording material S and a varnish applying apparatus (varnish coater) 200 for forming a varnish image on the recording material S. The varnish coater 200 is a post-step unit capable of being retrofitted to the image forming apparatus 100 for expanding a function thereof, and the image forming apparatus 100 and the varnish coater 200 are connected to each other so as to be capable of delivering the recording material S therebetween. Further, the image forming apparatus 100 and the varnish coater 200 are connected by data input/output interface (not shown) so that control signals, data, and the like are capable of being sent and received therebetween. The recording material S on which the toner image is formed by the image forming apparatus 100 is conveyed to the varnish coater 200 for the purpose of improving glossiness, water-resistance, abrasion resistance, and the like of the toner image formed on the recording material S, and then, by the varnish coater 200, the varnish image is formed on the recording material S separately from the toner image. Formation of the varnish image by the varnish coater 200 will be described later.

Figure 1:
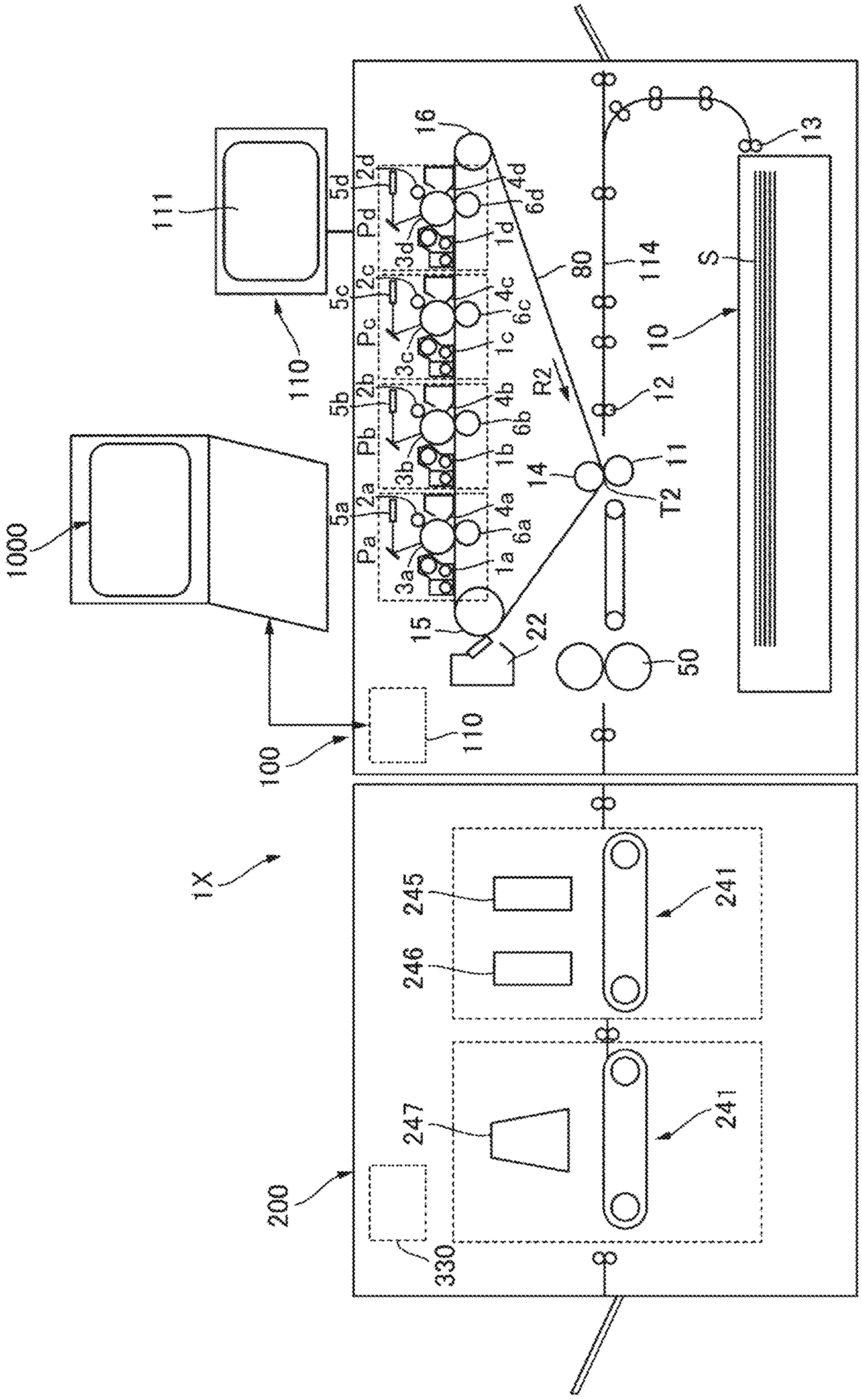
FIG. 1 is a schematic view showing a constitution of an image forming system.

Incidentally, although omitted from illustration in FIG. 1, the image forming apparatus 1X may also be provided with other post-step units such as a relay apparatus and a finisher apparatus. The relay apparatus is disposed between the image forming apparatus 100 and the varnish coater 200, and sends the recording material S conveyed from the image forming apparatus 100 to the varnish coater 200 after turning the recording material S upside down or after being temporarily stacked. The finisher apparatus performs, for example, punching for perforating the recording material S or stapling in which a plurality of recording materials S are stacked and stapled, or the like process, and then the perforated recording material S or the stapled recording materials S are discharged to a discharge tray. Further, in addition to such a post-step unit, for example, a recording material supplying apparatus (not shown) in which a large number of recording materials S are capable of being accommodated is provided, and the recording materials may be supplied from the recording material supplying apparatus to the image forming apparatus 100.

Image Forming Apparatus

The image forming apparatus 100 will be described. The image forming apparatus 100 is a tandem full-color printer of an electrophotographic type. The image forming apparatus 100 includes image forming units Pa, Pb, Pc, and Pd for forming images of yellow, magenta, cyan, and black, respectively. The image forming apparatus 100 forms a toner image on the recording material S on the basis of data relating to the toner image contained in image data sent from an image reading apparatus (not shown) connected to the image forming apparatus 100 or from an external device 1000 such as a personal computer. As the recording material S, it is possible to cite sheet materials such as plain paper, thick paper, rough paper, uneven paper, coated paper, and the like.

A feeding process of the recording material S of the image forming apparatus 100 will be described. The recording material S is accommodated in a cassette 10 in of a stacked form, and is sent from the cassette 10 in synchronism with an image forming timing by a supplying roller 13. The recording material S sent by the supplying roller 13 is fed to a registration roller pair 12 provided at an intermediate position of a feeding path 114. Then, in the registration roller pair 12, oblique movement correction and timing correction of the recording material S are made, and thereafter, the recording material S is sent to a secondary transfer portion T2. The secondary transfer portion T2 is a transfer nip formed as a transfer portion by an inner secondary transfer roller 14 and an outer secondary transfer roller 11, and the toner image is transferred onto the recording material in response to application of a secondary transfer voltage to the outer secondary transfer roller 11.

With respect to the above-described feeding process of the recording material S to the secondary transfer portion T2, an image forming process of the image sent to the secondary transfer portion T2 at a similar timing will be described. First, the image forming units will be described, but the image forming units Pa, Pb, Pc, and Pd for the respective colors are constituted substantially similar to each other except that colors of toners used in developing devices 1*a*, 1*b*, and 1*c* as a plurality of second developing portions are yellow (Y), magenta (M), and cyan (C) and that a color of toner used in a developing device 1*d* as a first developing portion is black (K). Therefore, in the following, as a representative, the image forming unit Pd for black will be described, and other image forming units Pa, Pb, and Pc are omitted from description. Incidentally, in this embodiment, photosensitive drums 3*a*, 3*b*, and 3*c* correspond a plurality of second photosensitive members, and a photosensitive drum 3*d* corresponds to a first photosensitive member.

The image forming unit Pd is constituted principally by the developing device 1*d*, a charging device 2*d*, the photosensitive drum 3*d*, a photosensitive drum cleaner 4*d*, an exposure device 5*d*, and the like. A surface of the photosensitive drum 3*d* as a photosensitive member is electrically charged uniformly in advance by the charging device 2*d*, and thereafter, an electrostatic latent image is formed by the exposure device 5*d* driven on the basis of a signal of image information. Then, the electrostatic latent image formed on the photosensitive drum 3*d* is developed into a toner image with use of a developer by the developing device 1*d*. Then, the toner image formed on the photosensitive drum 3*d* is primary-transferred onto an intermediary transfer belt 80 in response to application of a primary transfer voltage to a primary transfer roller 6*d* disposed opposed to the image forming unit Pd while sandwiching the intermediary transfer belt 80 therebetween. Primary transfer residual toner slightly remaining on the photosensitive drum 3*d* is collected to the photosensitive drum cleaner 4*d*.

The intermediary transfer belt 80 is stretched by the inner secondary transfer roller 14, and stretching rollers 15 and 16, and is driven in an arrow R2 direction. In the case of this embodiment, the stretching roller 16 also functions as a driving roller for driving the intermediary transfer belt 80. The respective color image forming processes performed in parallel by the image forming units Pa to Pd are carried out at timings when the associated toner image is superposedly transferred onto the upstream toner image primarily transferred onto the intermediary transfer belt 80. As a result, finally, a full-color toner image is formed on the intermediary transfer belt 80 and is conveyed to the secondary transfer portion T2. Incidentally, secondary transfer residual toner after passing through the secondary transfer portion T2 is removed from the intermediary transfer belt 80 by a transfer cleaner 22.

In the above, by the above-described feeding process and the above-described image forming process, in the secondary transfer portion T2, the timing of the recording material S and the timing of the full-color toner image coincide with each other, so that secondary transfer is carried out. Thereafter, the recording material S is conveyed to a fixing device 50, in which heat and pressure are applied to the recording material S, so that the toner image is fixed on the recording material S. The fixing device 50 as a fixing portion nips and feeds the recording material S on which the toner image is formed, and applies heat and pressure to the fed recording material S, so that the fixing device 50 fixes the toner image on the recording material S. That is, the toner of the toner image formed on the recording material S is melted and mixed, and is fixed as the full-color image on the recording material S. Thus, a series of the image forming processes is ended. Then, in the case of this embodiment, the recording material S on which the toner image is fixed is conveyed from the image forming apparatus 100 to the varnish coater 200.

Developing Device

In this embodiment, a two-component developer containing the toner and a carrier is used. The toner contains a binder resin, a colorant, and a parting agent (wax). As the binder resin, a known binder resin can be used. For example, it is possible to use resin materials such as a vinyl copolymer represented by a styrene-(meth)acrylic copolymer, a polyester resin, a hybrid resin obtained by chemically bonding a vinyl copolymer unit and a polyester unit to each other, an epoxy resin, a styrene-butadiene copolymer, and the like. As the colorant, it is possible to use known colorants for yellow (Y), magenta (M), cyan (C), and black (K), respectively, by the black toner (first toner) contains carbon black, and the toners (second toners) of yellow, magenta, and cyan do not contain the carbon black.

As the parting agent, for example, it is possible to cite aliphatic hydrocarbon waxes such as low-molecular weight polyethylene, low-molecular weight olefin copolymer wax, microcrystallin wax, Fischer-Tropsch wax, and paraffin wax; oxide of the aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

In the case of this embodiment, in the image data, data relating to the varnish image formed by the varnish coater 200 is also contained. That is, the varnish image data (second image data) relating to the varnish image is set separately from toner image data (first image data) relating to the toner images of the four colors YMCK. In the data relating to the varnish image contained in the image data, similar to the data relating to the toner images, for each of pages, an individual varnish image is associated with a coordinate of an image forming region on the recording material S.

Varnish Coater

Figure 2:
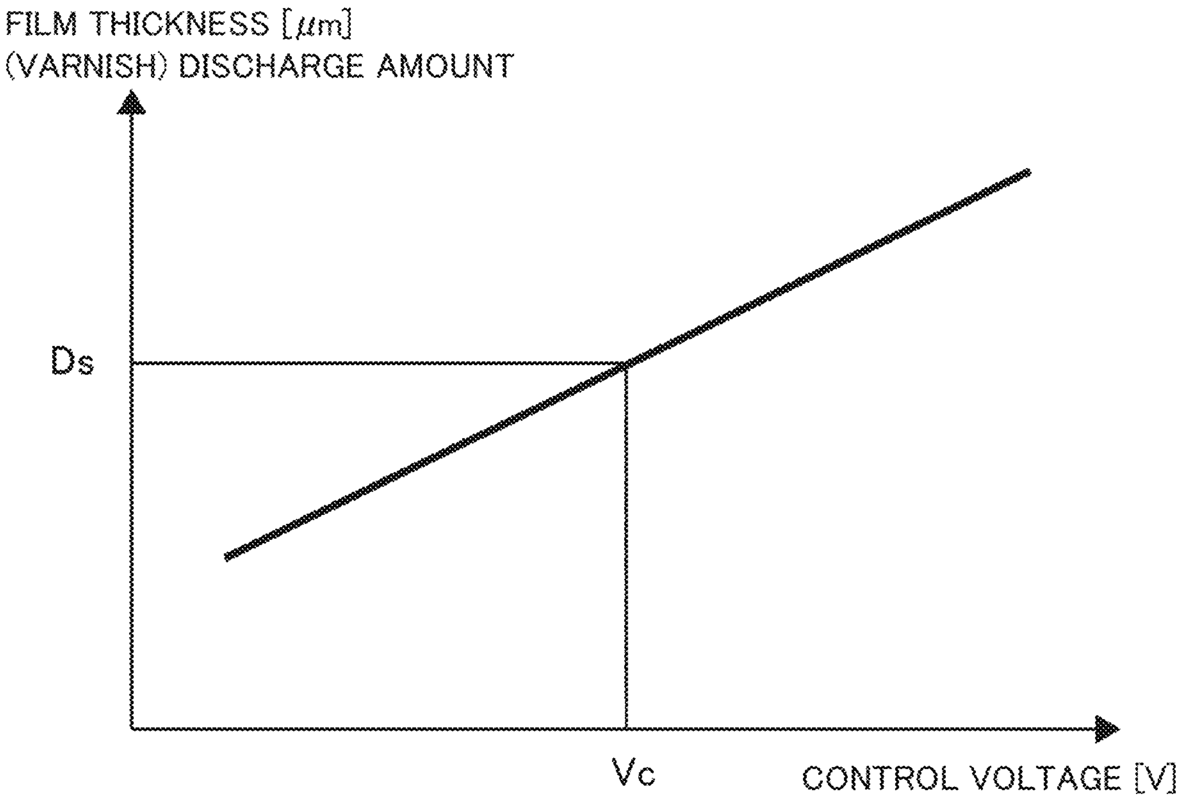
FIG. 2 is a graph showing a relationship between a control voltage and a film thickness which relate to formation of a varnish image.

Next, the varnish coater 200 will be described using FIGS. 1 and 2. The varnish coater 200 is a varnish applying apparatus of an ink jet type capable of forming varnish images such as characters, diagrams, graphics, and the like, which are desired by users. In the case of the ink jet type, varnish is ejected as droplets toward the recording material S, so that the varnish is deposited on the recording material S and thus the varnish image is formed. Incidentally, as the varnish, various species of the varnish such as aqueous varnish, oil varnish, and UV varnish may be used. In the following, the varnish coater 200 for forming the varnish image with use of UV (ultraviolet) varnish of a UV type solidified by UV irradiation will be described as an example.

The varnish coater 200 includes a sheet feeding portion 241, a position detecting portion 245, a varnish discharging (ejecting) portion 246, and a varnish solidifying portion 247. The sheet feeding portion 241 feeds the recording material S while attracting the recording material S to a belt feeding surface by an air sucking device (not shown) through holes formed in a feeding belt 242. Along a sheet feeding passage of this sheet feeding portion 241, in an order from an upstream side toward a downstream side of a feeding direction (arrow X direction) of the recording material S, the position detecting portion 245, the varnish ejecting portion 246, and the varnish solidifying portion 247 are disposed. The position detecting portion 245 is a detecting portion using a CCD, or the like, for example, and with respect to the recording material S fed while being sucked on the belt feeding surface, the position detecting portion 245 detects each of a position of a leading end of the recording material S with respect to the feeding direction, a position of each of opposing end portions with respect to a widthwise direction, and a position of the toner image on the recording material S. The position of the toner image is detected by the position detecting portion 245, so that the varnish coater 200 is capable of overprinting the varnish image superposedly on the toner image.

The varnish ejecting portion 246 as a varnish applying unit forms the varnish image on the recording material S by discharging (ejecting) and applying the varnish onto one surface (side) of the recording material S fed by the sheet feeding portion 241. The varnish ejecting portion 246 includes a plurality of print heads (not shown). The print heads are, for example, heads of a line type, in which a plurality of discharge (ejection) ports (not shown) are arranged and disposed in the widthwise direction crossing the feeding direction of the recording material S. A varnish discharging (ejecting) method of the print heads may employ a type using heat generating elements, a type using piezo electric elements, a type using electrostatic elements, a type using MEMS elements, and the like. Although illustration is omitted, the UV varnish is supplied from a tank to the associated one of the print heads through a tube.

A film thickness of the varnish image is influenced by an application amount per unit area of the UV varnish onto the recording material S. The varnish amount can be changed by adjusting a varnish discharge (ejection) amount from the print heads. For example, in the case of the type using the piezoelectric elements, as shown in FIG. 2, the varnish ejection amount varies depending on adjustment of a control voltage, and the film thickness of the varnish image is adjusted depending on an increase and a decrease in varnish ejection amount per unit area. In the case of this embodiment, the film thickness of the varnish image is adjusted in a range of, for example, "5-100 μm", preferably "10-70 μm".

Further, a resolution of the varnish image capable of being formed by the varnish coater 200 is, for example, "600 dpi", and in that case, the line width of the varnish image is adjusted in a "600 dpi" unit. Incidentally, the above-described range of the film thickness of the varnish image, the resolution of the varnish image, and an adjusting range of the line width of the varnish image may be appropriately changed depending on the varnish ejecting method of the print heads, a kind of the varnish, and the like.

Returning to FIG. 1, the recording material S on which the varnish image is formed on one surface thereof by the varnish ejecting portion 246 is sent by the sheet feeding portion 241 to the varnish solidifying portion 247 positioned downstream of the varnish ejecting portion 246 with respect to the feeding direction, and then the UV varnish on the recording material S is solidified by the varnish solidifying portion 247. The varnish solidifying portion 247 as an irradiation unit includes a UV lamp, and the UV lamp irradiates the UV varnish with rays (ultraviolet radiation) of a predetermined wavelength corresponding to the UV varnish. The UV lamp is disposed in an almost entire region of the recording material S with respect to the widthwise direction so as to be capable of emitting the UV light UV radiation, and is turned on only during passing of the recording material S. As described above, the varnish image is overprinted superposedly on the toner image formed on the recording material S.

The UV varnish used in this embodiment contains, as a main component, a photosensitive resin, a photosensitive monomer, a photoinitiator, an additive, and the like. As the photosensitive resin, for example, acrylic resin or the like having a (meth)acryloyl group is cited. As the photosensitive monomer, for example, a monomer, an oligomer, or the like in which at least one (meth)acryloyl group is contained in a molecule is cited. As the photoinitiator, for example, acetophenone, benzoin ethyl ether, 1-hydroxycyclohexyl phenyl ketone, or the like is cited. As the additive, for example, wax, plasticizer, leveling agent, solvent, polymerization inhibitor, antioxidant, photosensitizer, antifoaming agent, or the like is cited. The UV varnish may contain one or two or more species of these materials. Contents of respective components are not particularly limited, but it is preferable that the UV varnish contains the photosensitive resin in "1-20 wt. %", the photosensitive monomer in "30-70 wt. %", the photoinitiator in "5-15 wt. %", and the additive in "5 wt. %" or less, for example. As the UV varnish, it is possible to use, for example, "UV L Carton OP varnish (trade name)", "UV L Gloss OP varnish (tradename)", "UV Matt OP varnish (trade name)" and the like (manufactured by T&K TOKA Co., Ltd.).

Next, a control constitution of an image forming control system in the image forming system 1X will be described using FIG. 3 while making reference to FIG. 1. In this embodiment, an example in which the image forming apparatus 100 (specifically, the main controller 101) unitarily manages and controls an operation instruction to the varnish coater 200 was cited. Incidentally, to a main controller 101 and a varnish processing controller which are described later, in addition to the devices (portions) illustrated in FIG. 3, various devices such as motors and power sources are connected, but are not the main object of the present invention herein, and therefore, will be omitted from illustration and description.

Figure 3:
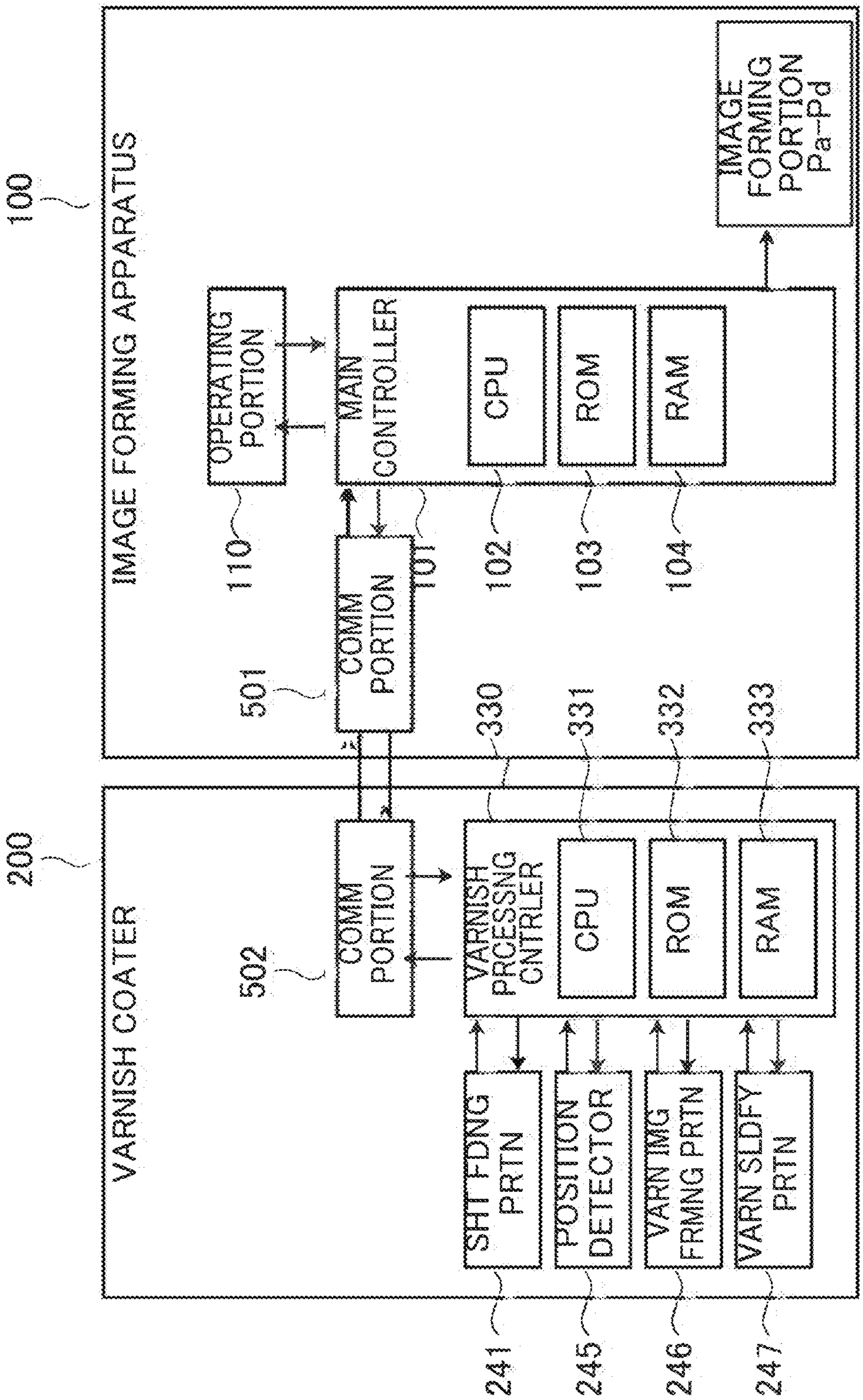
FIG. 3 is a control block diagram of an image forming control system in the image forming system.

In the image forming system 1X of this embodiment, as shown in FIG. 3, to the main controller 101 as a controller, the varnish processing controller 330 is connected via communication cables portions 501 and 502 so as to be capable of communicating operation instructions and various data. In accordance with the operation instructions from the main controller 101, the varnish processing controller 330 causes the varnish coater 200 to operate. That is, while the main controller 101 controls the operation of the image forming apparatus 100, the main controller 101 is capable of controlling entirety of the image forming system 1X including the varnish coater 200 by sending the operation instructions and the various data to the varnish coater 200. At this time, the main controller 101 is capable of functioning as an acquiring means for acquiring image data containing data relating to the toner image or the varnish image formed on the recording material S.

The above-described main controller 101 and the above-described varnish processing controller 330 may have the same constitution. For example, each of the controllers includes a CPU (central processing unit), a ROM (read only memory), and a RAM (random access memory).

The main controller 101 includes the CPU 102, the ROM 103, and the RAM 104. In the ROM 103, various programs such as "image forming processing" (see FIG. 5), which will be described later, are stored. In the RAM 104, various data, such as image data acquired from, for example, an operating portion 110 or the external device 1000 (see FIG. 1), are stored. Incidentally, the RAM 104 is capable of temporarily storing a calculation (computation) processing result or the like with execution of the various programs.

The image forming apparatus 100 includes an operating portion 110 including, for example, a liquid crystal display portion 111 (see FIG. 1), and the operating portion 110 is connected to the main controller 101. The operating portion 110 as an input portion is, for example, a touch panel. On the liquid crystal display portion 111, various screens presenting the various programs and various data or the like can be displayed by the operating portion 110. Further, the operating portion 110 receives input of a start of the various programs and input of the various data, and the like, depending on a screen touch operation by a user. On the touch panel, a screen including various buttons, switches, and the like as software keys are displayed.

The user is capable of inputting a start of an image forming job. In the case where the start of the image forming job is inputted, the CPU 102 executes "image forming processing (program)" (see FIG. 5) stored in the ROM 103. With this execution, together with the image forming apparatus 100, the varnish coater 200 is operated, so that the toner image and the varnish image are formed on the recording material S.

The varnish processing controller 330 includes a CPU 331, a ROM 332, and a RAM 333. The CPU 331 causes the sheet feeding portion 241, the position detecting portion 245, the varnish ejecting portion 246, and the varnish solidifying portion 247 of the varnish coater 200 to operate on the basis of a control program stored in the ROM 332. When the varnish processing controller 330 receives the varnish image data from the main controller 101, the varnish processing controller 330 causes the RAM 333 to store the received varnish image data, and then controls the varnish coater 200 so as to form the varnish image on the recording material S, on the basis of this varnish image data.

Figure 4:
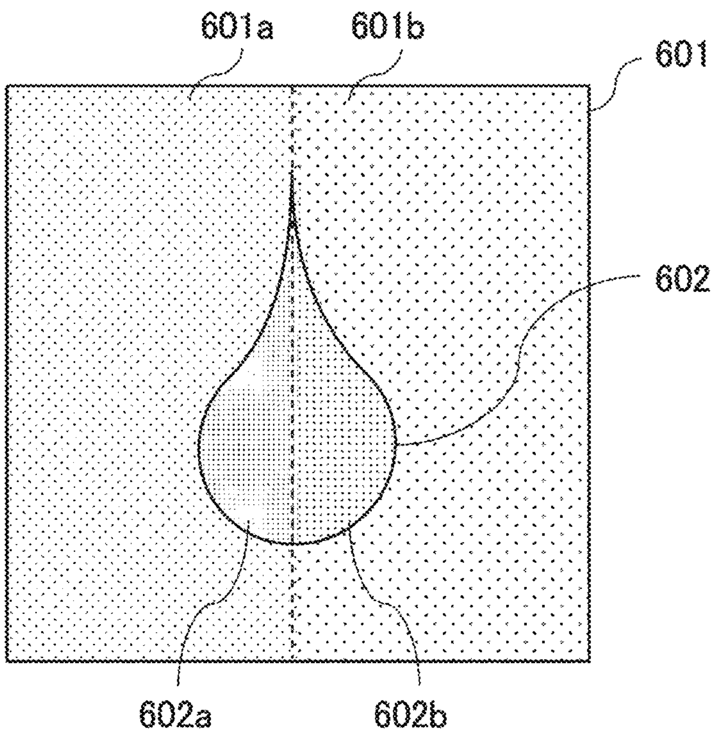
FIG. 4 is a schematic view showing an example of a toner image and the varnish image.

Incidentally, as already described above, in a conventional apparatus in which the varnish image is formed with the UV varnish solidified by the ultraviolet radiation, there was a liability that a color tint of the toner image at a portion where the toner image and the varnish image are superposed with each other is changed. Particularly, in the case where the toner image is a black toner image formed with only black toner including carbon black, a change in color tint was conspicuous. FIG. 4 is a schematic view showing an example of the toner image and the varnish image, in which a square toner image 601 and a droplet-like varnish image 602, which are formed on the recording material S, are schematically illustrated.

In each of the toner image data and the varnish image data, coordinate positions of many dots (pixels) constituting the toner image 601 or the varnish image 602 on the recording material S, and the like are contained. In FIG. 4, on the basis of the toner image data, of the toner image 601, a left(-hand) region **601*a* which is a left-half portion is formed with only the black toner, and a right(-hand) region 601*b* which is a right-half portion is formed with at least one of yellow toner, magenta toner, and cyan toner. Further, on the basis of the varnish image data, the varnish image 602 is formed superposedly on the toner image 601. In the case of the example of FIG. 4, an overlapping region in which the varnish image 602 is formed superposedly on the toner image 601 is an entire region (first region 602*a* and second region 602*b*) of the varnish image 602. The varnish image 602 includes the first region 602*a* which is a left-half portion overlapping with the left region 601*a* formed with only the black toner and includes the second region 602*b* which is a right-half portion overlapping with the right region 601*b*** formed with the toners of the colors other than the black toner.

Conventionally, in the case where the varnish image 602 is formed superposedly on the toner image 601 by using the UV varnish, there was a liability that the toner is discolored at a part of the left region **601*a* and the color tint of the toner image 601 is changed. This is because both the UV varnish and the carbon black generate heat by the influence of the ultraviolet radiation irradiated when the UV varnish is solidified and thus of the left region 601*a*, a region overlapping with the first region 602*a* of the varnish image 602 becomes a higher temperature than another region. Therefore, in this embodiment, in the case where the varnish image 602 is formed superposedly on the toner image 601, in order to prevent the color tint of the toner image 601** from being changed, heat generation of the toner due to the carbon black was suppressed. In the following, description of such will be made.

Image Forming Process

The "image forming process" of this embodiment will be described using FIG. 5 while making reference to FIGS. 3 and 4. The "image forming process" is started by the main controller 101 with input of a start of the image forming job and is repeated until an end of the image forming job.

Figure 5:
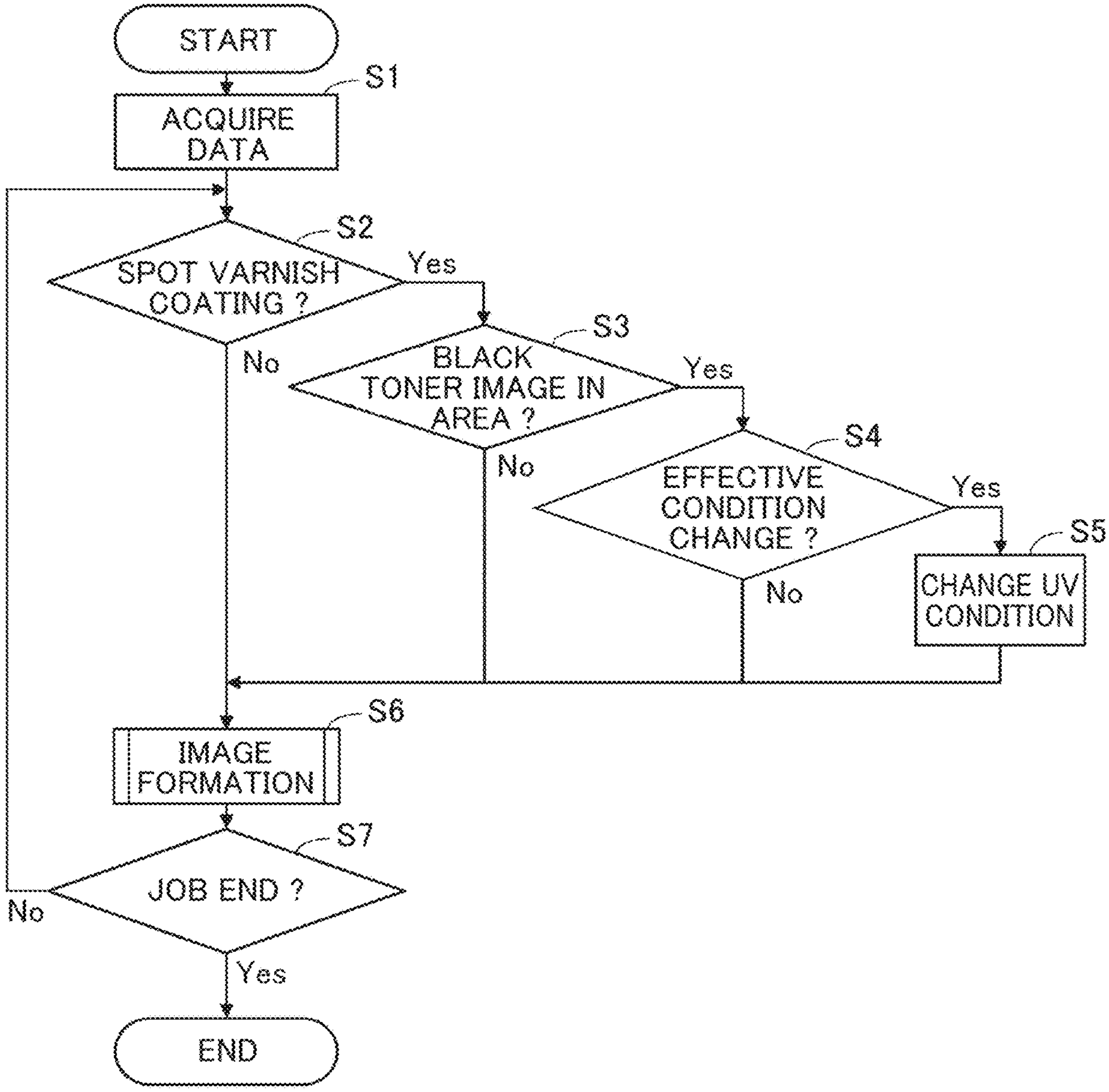
FIG. 5 is a flow chart showing an image forming process in an embodiment.

As shown in FIG. 5, the main controller 101 acquires image data stored in the RAM 104 with the start of the image forming job (S1). The main controller 101 makes reference to the acquired image data and discriminates whether or not the image data includes the varnish image data and is for performing spot varnish coating (S2). In the case of an example shown in FIG. 5, in the image data, the varnish image data relating to the varnish image 602 is included together with the toner image data relating to the toner image 601. In the case where the varnish image data is not included in the image data (No of S2), the main controller 101 causes the image forming apparatus 100 to perform the image forming process for forming the toner image on the basis of the toner image data (S6). In this case, the main controller 101 does not cause the varnish coater 200 to form the varnish image. Thereafter, the main controller 101 causes the process to go to a step S7.

In the case where the varnish image data is included in the image data (Yes of S2), the main controller 101 discriminates whether or not there is a toner image formed with only the black toner in an overlapping region (area) in which the varnish image is formed superposedly on the toner image (S3). The main controller 101 compares the toner image data with the varnish image data, and in the case where there are both of the varnish image and the toner image formed with only the black toner (hereinafter, this toner image is referred to as a black toner image) in the same coordinate, the main controller 101 discriminates that there is the black toner image in the overlapping region. In the case of the example shown in FIG. 4, in the overlapping region (the first region 602*a* and the second region 602*b*) between the toner image 601 and the varnish image 602, a coordinate of the first region 602*a* and a part of coordinates of the left region 601*a* of the black toner image are the same coordinate, and therefore, discrimination that there is the black toner image in the overlapping region is made.

In the case where there is no black toner image in the overlapping region (No of S3), the main controller 101 causes the image forming apparatus 100 to form the toner image on the basis of the toner image data and causes the varnish coater 200 to perform the image forming process for forming the varnish image on the basis of the varnish image data (S6). In this case, the main controller 101 causes the varnish coater 200 to form the varnish image in accordance with a predetermined "reference UV condition" stored in advance in the ROM 103 or the like (see FIG. 3). As the "reference UV condition", for example, an irradiation light quantity (first light intensity) of the ultraviolet radiation by the varnish-solidifying portion 247 is set at "97 mJ/cm$^2$"), (first light quantity), and a conveying speed of the recording material S by the sheet conveying portion 241 is set at "11.7 m/min" (first speed). After the toner image and the varnish image are formed, the main controller 101 causes the process to go to the step S7.

On the other hand, in the case where there is the black toner image in the overlapping region (Yes of S3), the main controller 101 discriminates whether a condition changing function for changing the "reference UV condition" is enabled or disabled (S4). The user is capable of inputting setting of enabling/disabling of the condition changing function arbitrarily through the operating portion 110, and the main controller 101 discriminates whether the condition changing function is enabled or disabled in accordance with user input through the operating portion 110. When the condition changing function is enabled, a mode of the image forming system 1X is set at an "image quality priority mode". When the condition changing function is disabled, the mode of the image forming system 1X is set at a "productivity priority mode". In the case where the mode is set at the "productivity priority mode", the varnish image is formed in accordance with the "reference UV condition". In the case where the mode is set at the "image quality priority mode", the varnish image is formed in accordance with a "UV condition after change" in which the "reference UV condition" is changed as described later. Incidentally, discrimination by the main controller 101 is not limited to the discrimination by the main controller 101 such that the main controller 101 acquires "enabling/disabling of condition changing function" inputted through the operating portion 110 by the user; the main controller 101 may also make discrimination by reading the setting of the "enabling/disabling of condition changing function" stored in advance in the RAM 104 or the like (see FIG. 3).

In the case where the condition changing function is disabled (No of S4), the main controller 101 causes the image forming apparatus 100 to form the toner image on the basis of the toner image data and causes the varnish coater 200 to perform the image forming process for forming the varnish image on the basis of the varnish image data (S6). In this case, the mode of the image forming system 1X is set at the "productivity priority mode", and the main controller 101 causes the varnish coater 200 to form the varnish image in accordance with the above-described "reference UV condition". Thereafter, the main controller 101 causes the process to go to the step S7.

In the case where the condition changing function is enabled (Yes of S4) (effective condition change), the main controller 101 changes the "reference UV condition" (S5). Then, the main controller 101 causes the image forming apparatus 100 to form the toner image on the basis of the toner image data and causes the varnish coater 200 to perform the image forming process for forming the varnish image on the basis of the varnish image data (S6). In this case, the mode of the image forming system 1X is set at the "image quality priority mode", and the main controller 101 causes the varnish coater 200 to form the varnish image in accordance with the "UV condition after change" in which the above-described "reference UV condition" is changed. Thereafter, the main controller 101 causes the process to go to the step S7.

In the case where the "reference UV condition" is changed, in the "UV condition after change", compared with the "reference UV condition", the irradiation light quantity is lowered, and an irradiation time of the ultraviolet radiation is prolonged. In this embodiment, in order to prolong the irradiation time of the ultraviolet radiation, the conveying speed of the recording material S by the sheet conveying portion 241 is slowed. That is, in the case where in the "reference UV condition", the irradiation light quantity of the ultraviolet radiation irradiated by the varnish-solidifying portion 247 is a first light quantity and the conveying speed of the recording material S by the sheet conveying portion 241 is a first speed, in the "UV convey after change", the irradiation light quantity of the ultraviolet radiation is a second light quantity (second light intensity) smaller than the first light quantity and the conveying speed of the recording material S is a second speed slower than the first speed. Incidentally, it is preferable that an integrated light quantity (=(irradiation light quantity)×(irradiation time)) based on the irradiation light quantity (first light quantity) and the conveying speed (first speed) in the "reference UV condition" and an integrated light quantity based on the irradiation light quantity (second light quantity) and the conveying speed (second speed) in the "UV condition after change" are equal to each other.

In the process of the step S7, the main controller 101 discriminates whether or not the image forming job is ended (S7). In the case where the image forming job is ended (Yes of S7), the main controller 101 ends the "image forming process". In the case where the image forming job is not ended (No of S7), the main controller 101 causes the process to return to the process of S2, and executes processes of the above-described steps S2 to S5.

In a table 1, an experimental result conducted by the present inventors in order to check occurrence or non-occurrence of discoloration of the toner image with heat generation due to irradiation of the carbon black with the ultraviolet radiation is shown.

TABLE 1

| TONER USED | CMY | ONLY K | ONLY K |
|---|---|---|---|
| KTAR*1 | 0% | 100% | 100% |
| UVLQ*2 | 100% | 100% | 50% |
| IT*3 | 100% | 100% | 200% |
| ILQ*4 | 100% | 100% | 100% |
| DCO*5 | NO | YES | NO |

*1"KTAR" is a K toner area ratio in the overlapping region.
*2"UVLQ" is the UV light quantity.
*3"IT" is the irradiation time.
*4"ILQ" is the integrated light quantity.
*5"DCO" is discoloration occurrence.

An experiment was conducted in the following manner. First, a toner image is formed on the recording material S on the basis of predetermined image data. Herein, the predetermined image data includes toner image data for forming a black toner image with only black toner (K toner) so as to provide an area ratio of "100%" and toner image data for forming a toner image with C toner, M toner, and Y toner so as to provide an area ratio of "0%". The toner image formed with the C toner, the M toner, and the Y toner is a pseudo black toner image by which black comparable in level to the black of the black toner image formed with only the black toner is expressed, and in the predetermined image data, the area ratio of each of the C (cyan) toner, the M (magenta) toner, and the Y (yellow) toner is defined.

In this embodiment, in the case where a maximum toner application amount per unit area of each of the toner images is "100%", a ratio of a toner application amount per unit area of an actually formed toner image is referred to as an "area ratio".

Then, on each of the black toner image and the toner image formed with the C toner, the M toner, and the Y toner, a varnish image of "40 μm" in thickness was formed superposedly with the UV varnish by a UV coater ("DDC-810", manufactured by Duplo Corp.) Then, the recording material S on which the varnish image and each of the black toner image and the above-described toner image were formed was irradiated with the ultraviolet radiation, so that the varnish image was solidified. On the recording material S, on which the toner image was formed with the C toner, the M toner, and the Y toner, the varnish image was formed in accordance with the "reference UV condition". On the other hand, on the recording material S on which the black toner image was formed, the varnish image was formed in accordance with each of the "reference UV condition" and the "UV condition after change". Finally, the present inventors checked whether or not the discoloration of the toner image on the recording material S occurred by eye observation.

As shown in the table 1, in the case where the varnish image was formed in the "reference UV condition" on the toner image formed with the C toner, the M toner, and the Y toner, the discoloration of the toner image did not occur. This is because although heat generation with solidification of the UV varnish occurs, the C toner, the M toner, and the Y toner do not contain the carbon black, and therefore, the heat generation due to the carbon black does not occur.

On the other hand, in the case where the varnish image was formed in the "reference UV condition" on the black toner image (operation in the productivity priority mode), the discoloration of the toner image occurred. This is because in response to the irradiation with the ultraviolet radiation, in addition to the heat generation with the solidification of the UV varnish, the heat generation due to the carbon black is capable of occurring. On the other hand, in the case where the varnish image was formed in the "UV condition after change" on the black toner image (operation in the image quality priority mode), the discoloration of the toner image did not occur. In the "UV condition after change", when the "reference UV condition" is "100%", the irradiation light quantity is lowered to "50%" (second light quantity), while the irradiation time is increased to "200%, i.e., the conveying speed of the recording material S is slowed to a half speed (second speed). That is, an integrated light quantity in the "UV condition after change" is kept at an integrated light quantity in the "reference UV condition". However, in the case of the operation in the "image quality priority mode", the conveying speed of the recording material S is slowed to ½ thereof, so that compared with the operation in the "productivity priority mode", the number of sheets subjected to image formation per unit time is decreased. That is, in the case of the operation in the "image quality priority mode", productivity of the image forming system 1X is capable of being lowered.

As described above, in this embodiment, in the case where there is the black toner image in the overlapping region between the toner image and the varnish image, compared with the case where there is no black toner image in the overlapping region, the irradiation light quantity (light intensity) of the ultraviolet radiation for solidifying the varnish image is made small. The irradiation light quantity of the ultraviolet radiation is made small, so that heat generation due to the carbon black is suppressed. However, when the irradiation light quantity of the ultraviolet radiation is made small, the varnish image becomes hard to be solidified, and therefore, in order to ensure an integrated light quantity necessary to solidify the varnish image, the conveying speed of the recording material S is made slow for prolonging the irradiation time depending on the irradiation light quantity (light intensity) of the ultraviolet radiation which is made small. In the case where the conveying speed is lowered by lowering the ultraviolet radiation intensity (i.e., in the case where the irradiation time is prolonged), compared with the case where the ultraviolet radiation intensity is not lowered, an instantaneous heat generation amount of the toner image decreases. This would be considered because although a total of the heat generation amount of heat applied to the toner image is not changed, heat is dissipated through the recording material S and air and thus a temperature of the toner image is not continuously increased. Accordingly, in the case where the ultraviolet radiation intensity is lowered and the conveying speed is lowered (i.e., the irradiation time is prolonged), the varnish image can be sufficiently cured (solidified) while suppressing the discoloration of the toner image. Thus, in the case where the varnish image is formed with the UV varnish solidifiable by the ultraviolet radiation superposedly on the toner image formed with the toner containing the carbon black, it is possible to suppress occurrence of the discoloration of the toner image.

Other Embodiments

Incidentally, in the case where the main controller 101 changes the "reference UV condition" (see S5 of FIG. 5), the irradiation light quantity may be determined by the above-described "area ratio". The present inventors conducted an experiment in which the case where the irradiation light quantity was changed by the "area ratio", occurrence or non-occurrence of the discoloration of the toner image with heat generation due to irradiation of the carbon black with the ultraviolet radiation was checked. A table 2 shows a result of the experiment. The experimental result from first to third columns from the column of evaluation items are the same as those in the table 1.

TABLE 2

| TONER USED | CMY | ONLY K | ONLY K | ONLY K | ONLY K |
|---|---|---|---|---|---|
| KTAR*[1] | 0% | 100% | 100% | 95% | 95% |
| UVLQ*[2] | 100% | 100% | 50% | 100% | 80% |
| IT*[3] | 100% | 100% | 200% | 100% | 125% |
| ILQ*[4] | 100% | 100% | 100% | 100% | 100% |
| DCO*[5] | NO | YES | NO | YES | NO |

*[1]"KTAR" is a K toner area ratio in the overlapping region.
*[2]"UVLQ" is the UV light quantity.
*[3]"IT" is the irradiation time.
*[4]"ILQ" is the integrated light quantity.
*[5]"DCO" is discoloration occurrence.

As shown in the table 2, in the case where the varnish image was formed in the "reference UV condition" on the black toner image formed with an area ratio of "95%" (the fourth column from the column of evaluation items), the discoloration of the toner image occurred. On the other hand, in the case where the varnish image was formed in the "UV condition after change" on the black toner image formed with the area ratio of "95%" (the fifth column from the evaluation items), the discoloration of the toner image did not occur. Here, a weight per unit area of the black toner image existing on the recording material S in the case where the area ratio was "100%" was "0.50 mg/cm$^2$", and a weight per unit area of the black toner image existing on the recording material S in the case where the area ratio was "95%" was "0.475 mg/cm$^2$".

As regards the black toner image formed with the area ratio of "100%", when as the "UV condition after change", the irradiation light quantity was "50%" and the irradiation time was "200%", the discoloration of the toner image did not occur (the third column from the evaluation item column). On the other hand, as regards the black toner image formed with the area ratio of "95%", when as the "UV condition after change", the irradiation light quantity was "80%" and the irradiation time was "125%", the discoloration of the toner image did not occur (the fifth column from the evaluation item column). That is, in the case where the area ratio is a first area ratio, compared with the case where the area ratio is a second area ratio smaller than the first area ratio, the main controller 101 may only be required so that as the "UV condition after change", the irradiation light quantity (light intensity) is set low and the conveying speed is set slow. In the case where the area ratio is "100%", compared with the case where the area ratio is "95%", as described above, the weight per unit area of the black toner image is large and thus heat is liable to generate by the influence of the irradiation light quantity, and therefore, the irradiation light quantity (light intensity) is made small, so that the heat generation due to the carbon black is suppressed.

As described above, when the irradiation light quantity (light intensity and the irradiation time (conveying speed) in the "UV condition after change" are changed depending on the area ratio, it is possible to compatibly realize suppression of the occurrence of the discoloration of the toner image and suppression of a lowering in productivity of the image forming system 1X, thus being preferable.

Incidentally, in the above-described embodiments, the case where the spot varnish coating was made by the varnish coater 200 was described as an example, but even in the case where overcoating is made by the varnish coater 200, this embodiment may also be applied. Further, in the above-described embodiments, the case where the varnish image was formed in accordance with the "UV condition after change" in the case where there is the black toner image in the overlapping region was described as an example, but the above-described embodiments are not limited thereto. Even in the case where the toner image is formed with a mixture of the black toner with toner of another color without being limited to the black toner image, the varnish image may be formed by changing the UV condition. Further, the above-described embodiments may also be applied to an image forming system 1X provided with a monochromatic image forming apparatus capable of forming a toner image with only the black toner.

According to the present disclosure, in the case where the varnish applied to the toner image formed with the toner containing the carbon black is solidified, the discoloration of the toner image can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-110181 filed on Jul. 8, 2022, which is hereby incorporated by reference herein in its entirety.

What is claimed is:

1. An image forming system comprising:

an image forming unit configured to form a toner image on a recording material, the toner image including a black toner image using black toner containing carbon black, and a color toner image using color toner containing no carbon black, a varnish applying unit configured to apply varnish to the recording material on which the toner image is formed by the image forming unit;

a conveying unit configured to convey the recording material to which the varnish is applied by the varnish applying unit; and an irradiation unit configured to irradiate the varnish on the recording material with light to cure the varnish on the recording material during conveyance of the recording material by the conveying unit, wherein intensity of the light irradiated by the irradiation unit to the varnish on a first recording material having the black toner image is lower than intensity of the light irradiated by the irradiation unit to the varnish on a second recording material having the color toner image without the black toner image, and wherein a conveying speed of the first recording material by the conveying unit in a period in which the varnish on the first recording material is irradiated with light is slower than a conveying speed of the second recording material by the conveying unit in a period in which the varnish on the second recording material is irradiated with light.

2. The image forming system according to claim 1, wherein the varnish applying unit applies varnish onto the toner image on the recording material.

3. The image forming system according to claim 1, wherein the image forming unit forms the toner image based on image data, and wherein a conveying speed of the recording material by the conveying unit is controlled based on the image data.

4. The image forming system according to claim 1, wherein the image forming unit forms the toner image based on image data, and wherein intensity of the light irradiated to the varnish by the irradiation unit is controlled based on the image data.

5. The image forming system according to claim 1, wherein an integrated light quantity determined on the basis of the conveying speed of the first recording material conveyed by the conveying unit and the intensity of the light irradiated to the varnish on the first recording material from the irradiation unit is equal to an integrated light quantity determined on the basis of the conveying speed of the second recording material conveyed by the conveying unit and the intensity of the light irradiated to the varnish on the second recording material from the irradiation unit.

6. The image forming system according to claim 1, wherein the varnish is UV varnish of an ultraviolet radiation solidifiable type, and wherein the light irradiated from the irradiation unit is ultraviolet radiation.

7. A varnish applying apparatus for applying varnish to a recording material, comprising:

a varnish applying unit configured to apply varnish to the recording material;

a conveying unit configured to convey the recording material to which the varnish is applied by the varnish applying unit; and an irradiation unit configured to irradiate the varnish on the recording material with light to cure the varnish on the recording material during conveyance of the recording material by the conveying unit, wherein intensity of the light irradiated by the irradiation unit to the varnish on a first recording material having a black toner image using black toner containing carbon black is lower than intensity of the light irradiated by the irradiation unit to the varnish on a second recording material having a color toner image using color toner containing no carbon black without the black toner image, and wherein a conveying speed of the first recording material by the conveying unit in a period in which the varnish on the first recording material is irradiated with light is slower than a conveying speed of the second recording material by the conveying unit in a period in which the varnish on the second recording material is irradiated with light.

8. The varnish applying apparatus according to claim 7, wherein the varnish applying unit applies the varnish onto the black toner image on the first recording material and applies the varnish onto the color toner image on the second recording material.

9. The varnish applying apparatus according to claim 7, wherein an integrated light quantity determined on the basis of the conveying speed of the first recording material conveyed by the conveying unit and the intensity of the light irradiated to the varnish on the first recording material from the irradiation unit is equal to an integrated light quantity determined on the basis of the conveying speed of the second recording material conveyed by the conveying unit and the intensity of the light irradiated to the varnish on the second recording material from the irradiation unit.

10. The varnish applying apparatus according to claim 7, wherein the varnish is UV varnish of an ultraviolet radiation solidifiable type, and wherein the light irradiated from the irradiation unit is ultraviolet radiation.

* * * * *